US008583548B1

(12) United States Patent
Goldstein et al.

(10) Patent No.: US 8,583,548 B1
(45) Date of Patent: Nov. 12, 2013

(54) SYSTEM AND METHOD FOR MAKING PAYMENTS VIA A NETWORK

(75) Inventors: Guy Goldstein, Los Altos, CA (US); Dan Blumenfeld, Los Altos, CA (US); Stephen Schultz, Menlo Park, CA (US); Nisim Tapiro, Pardesiya (IL)

(73) Assignee: Check, Inc., Palo Alto, CA (US)

( * ) Notice: Subject to any disclaimer, the term of this patent is extended or adjusted under 35 U.S.C. 154(b) by 0 days.

(21) Appl. No.: 13/200,788

(22) Filed: Sep. 30, 2011

(51) Int. Cl.
*G06Q 40/00* (2012.01)

(52) U.S. Cl.
USPC ........................ 705/39; 705/14.23; 705/14.38

(58) Field of Classification Search
USPC ........................ 705/35, 39, 14.1, 14.23, 14.38
See application file for complete search history.

(56) References Cited

U.S. PATENT DOCUMENTS

| | | | | |
|---|---|---|---|---|
| 8,266,031 | B2 * | 9/2012 | Norris et al. | 705/35 |
| 8,275,685 | B2 * | 9/2012 | Ross et al. | 705/35 |
| 2004/0054579 | A1 * | 3/2004 | Lamb et al. | 705/14 |
| 2009/0287557 | A1 * | 11/2009 | Etheredge et al. | 705/14.17 |
| 2011/0029367 | A1 * | 2/2011 | Olson et al. | 705/14.25 |
| 2011/0029430 | A1 * | 2/2011 | Norris et al. | 705/39 |

* cited by examiner

*Primary Examiner* — Jagdish Patel
(74) *Attorney, Agent, or Firm* — Charles E. Gotlieb; Innovation Partners

(57) ABSTRACT

A system and method ranks funding sources to make payments according to user preferences, which may be both explicitly provided and learned, and the benefits and costs of using such funding sources, and displays the funding sources in ranked order, allows the user to select one or more funding sources, and makes the payment using the selected one or more funding sources.

19 Claims, 4 Drawing Sheets

SYSTEM AND METHOD FOR MAKING PAYMENTS VIA A NETWORK

FIELD OF THE INVENTION

The present invention is related to computer software and more specifically to computer software for electronic payments.

BACKGROUND OF THE INVENTION

People receive bills and desire to pay them. However, some people have different sources of payment that they can use to pay their bills. What is needed is a system and method that can assist people in selecting the best source of funds for paying a bill.

SUMMARY OF INVENTION

A system and method allows a user to provide an initial set of preference information and information about potential funding sources. The user provides information that may be used to retrieve information about funding sources (e.g. bank accounts and credit card accounts), such as account numbers, and a URL, username and password that will allow balance, transaction and other information to be retrieved from a web site operated by the funding source. Such information may include the APR and credit limit of a credit card. Additional information regarding rewards for using the funding source may be received from the user or an entity related to the funding source such as a bank or card issuer.

Account information for each funding source may be retrieved for each funding source supplied by the user on a regular basis or when the user logs in. Such information may include identifying regular moneys flows into or out of an account, such as a paycheck or rent payment that is typically sent from a particular funding source.

The user may provide information about bills or other payments the user would like to make (such as point of sale information like a merchant account identifier and an amount to pay, such as could be obtained using a mobile device employing conventional near field communications techniques, or the account identifier and an amount of another person or entity the user wishes to pay) or information that can be used to obtain the user's bills. The user may also arrange for some or all bills or other requests for payment to be sent to an operator of the system or entity performing the method in such a way that the bills are identifiable as those of the user (e.g. username @ methodoperator.com). Such information may include the amount and due date of the bill.

When the due date for a bill is upcoming, a reminder may be sent to the user, such as by providing a message icon on the user's cell phone or an e-mail message, or both of these, to remind the user to log in.

When the user logs in, the user will see a list of bills that are coming due within a threshold amount of time, and may also see options for providing payment to a merchant (e.g. a merchant having a location the user is currently visiting) or providing payment to an individual. The user may select one of the bills or one of the other options. If the user selects one of the other options, an indication of the amount and the payee is also received from the user.

The available funding sources are then scored based on the extent to which the funding source is sufficient to pay the bill or amount (the sufficiency score), how well the funding source provides a particular type of benefit, and how low the cost of using the funding source is. The cost may be identified as a function of the money flows, to reduce the cost of a funding source if it can be paid off in full from an expected paycheck that was identified from the money flows as described above or to increase the cost if a different bill is usually paid from that funding source that would exceed the available funds from that source if that different bill and the selected bill are both paid from the same funding source. A total score for each funding source may be identified as a sum of each of the scores described above, multiplied by a preference weight for the user that indicates the preference of the user for each type of benefit, and a preference to avoid the costs. The funding sources that have a threshold sufficiency score are displayed in descending order of the total score for each funding source, along with the balance of that funding source. Other information may be provided for each funding source, such as the current amount available from that source, and one or more reasons for its order in the list of funding sources and an indication that the available balance may be needed for a different bill or payment that the user usually pays from that funding source.

The user selects one of the funding source to be used to pay the bill or other option (e.g. the point of sale merchant or individual or entity), and the bill or other option is paid using the funding source, and the preference weights may be updated based on the user's selected funding source.

DETAILED DESCRIPTION OF A PREFERRED EMBODIMENT

Figure 1:
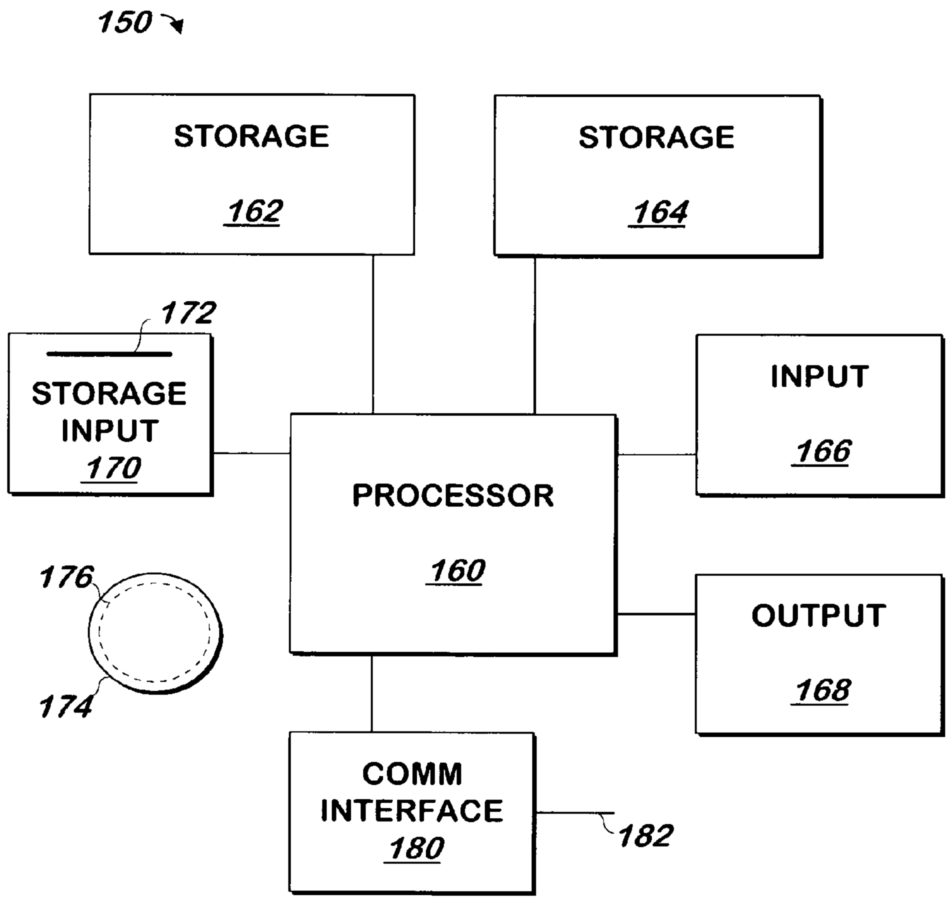
FIG. 1 (PRIOR ART)
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS SPARC ENTERPRISE M9000 SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, a near field communications network, or all of these.

Receive Registration Information from User.

Figure 2:
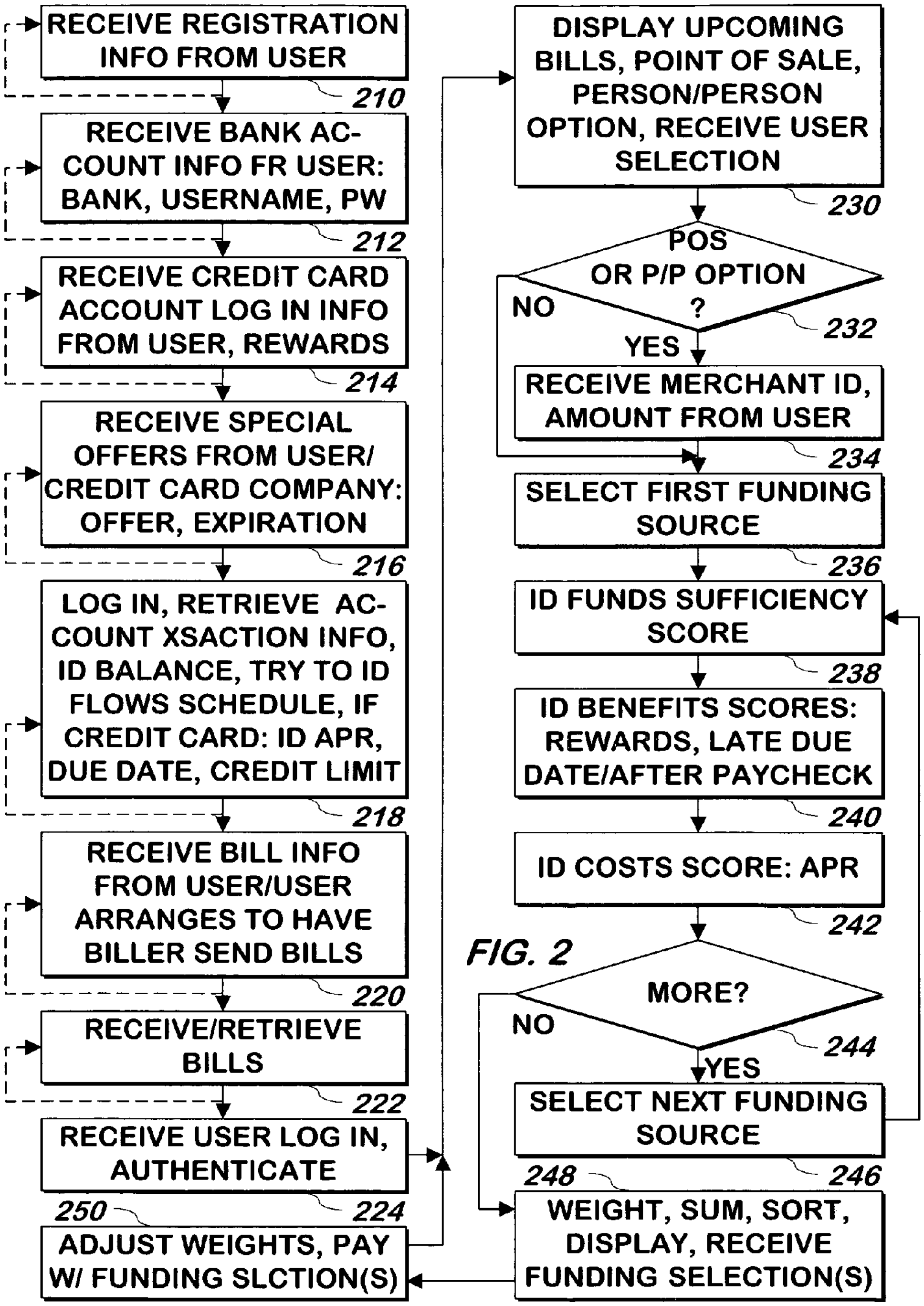
FIG. 2 is a flowchart illustrating a method of paying bills according to one embodiment of the present invention.

FIG. 2 is a flowchart illustrating a method of paying bills and making other types of payments such as point of sale payments and payments to individuals and other entities according to one embodiment of the present invention. Referring now to FIG. 2, registration information is received 210 from the user. In one embodiment, registration information, including a username (which may be an e-mail address) and corresponding password, an e-mail address (if not already received) and a cell phone identifier, may be received with an initial set of preferences indicating the factors by which the user prefers his or her funding sources to be weighted in the manner described below.

In one embodiment, the user may provide one or more preferences in response to one or more preference questions, and initial weights for each preference may be assigned to the user account based on those preference responses, or the initial weights may be automatically assigned for the user, or the user may provide some other indication that may be used to assign the initial weights for the user.

In one embodiment, there is a set of initial preferences. The initial preferences may be identified from the questions as a set of weights, one preference indicating a desire to avoid fees and costs, and several preferences, one for each type of reward that may be available to the user from which preferences are received or available to any user, for employing a particular funding source, such as a preference for receiving airline miles and another preference for receiving cash back for a purchase.

In one embodiment, preference information may include a specified order of display of the funding sources (e.g. always display this funding source first, another one second and another one last), or information that may be used to alter the order in which funding sources are displayed (e.g. boost the score of this funding source by 20% relative to other funding sources when ordering them for display), and may be received with the account information described below.

In one embodiment, registration information from any number of users may be received or updated at any time, and the process of receiving registration information from the user is an independently operating process, as shown by the dashed line in the Figure at step 210.

Receive Bank Account Information from User: Bank, Username, Password.

Bank account information is received 212 from the user. In one embodiment, bank account information may include the bank username and bank password corresponding to each bank account from which the user wishes to make available to draw funds to pay bills, in the manner described below, as well as a bank identifier corresponding to the bank at which the user bank account is operated and/or the URL of a web site through which the bank account is accessed with the bank username and bank password. Bank account information may be received for any number of bank accounts from any number of users at any time and may be updated by the user at any time. The process of receiving bank account information from the user is an independently operating process, as shown by the dotted line in the Figure at step 212.

Receive Credit Card Information from User, Rewards.

Credit card information for each credit card the user may wish to pay or to use as a funding source, and rewards program information corresponding to the credit card, is received from the user 214. In one embodiment, credit card information may include a credit card number, expiration date and CVV, and credit card log in information such as the name or URL of the financial institution that provides online transaction and other information about the credit card, credit card web site username and credit card web site password. Credit card information may also include a credit card identifier corresponding to the credit card company issuing the user credit card, or the URL of the web site through which access to the user credit card account is provided, or both.

Rewards program information may be received as details on specific rewards programs associated with the user credit card account, such as a rewards programs that allows the user to earn airline miles for qualifying purchases, or a rewards program that allows the user to earn points for qualifying purchases, which may then later be redeemed in exchange for merchandise or services, or a cash back percentage indicating the percentage of funds spent on qualifying purchases that may be earned back by the user. In one embodiment, rewards program information associated with the user's credit card may be received with the credit card information, or the rewards program information may be received or retrieved from the credit card company or financial institution, as described below. Credit card information for any number of credit card accounts may be received or updated from any number of users at any time.

In one embodiment, if rewards program information is received from the credit card company (e.g. VISA or MASTERCARD) or financial institution (e.g. BANK OF AMERICA), the type or types of cards participating in the program are specified by the credit card company and received and the rewards program may be considered to apply to all users with the same type of card from the same financial institution or issuer. In one embodiment, if rewards program information is received form the user, the program may be assumed to apply to other users with the same type of card from the same institution.

The process of receiving credit card log in information is an independently operating process, as shown by the dotted line in the Figure at step 214.

Other Types of Accounts May be Employed.

The various accounts described herein may be used as funding sources to make payments as described herein. In one embodiment, steps 212 and 214 may include the receipt of information of other types of sources of funds. For example, other types of prepaid accounts such as a PAYPAL account, or a prepaid mobile telephone or other mobile device account that may be used to supply funds to make payments may be used as a bank account. A debit card number may be received for any prepaid or other type of bank account. Other types of credit accounts may be used, such as a postpaid mobile telephone or other mobile device account may be used as a credit card account as described herein. In one embodiment, each source of funds is identified as one for which payment is made from funds in the account, such as a bank account, or is one for payment may be made from a credit that may be paid later, such as a charge card account. The determination may be made by comparing information received about the source of funds with a database of all potential sources of funds and their types, or it may be inferred from information retrieved or received as described herein. For example, if transaction information received below indicates that the source of funds has a credit limit, the source of funds may be determined to be one for which credit is issued to the user.

Receive Special Offers from User/Credit Card Company: Offer, Expiration.

Special offers information is received 216. Special offers information may include the special offer details of any special deals or promotions offered by a credit card company or financial institution, such as earning double miles on qualifying purchases, or a higher cash back percentage during a certain period of time or for qualifying purchases. Special offer details may include identifiers corresponding to a specific user credit card or specific types of credit cards and issuers or financial institutions for which the special offer applies, such as an identifier corresponding to credit cards that have platinum level status, as well as other details of the special offer, such as the type(s) of purchase(s) for which the special offer may apply, and the specified date or dates for which the special offer may apply or expire. Special offers information may be received from a credit card company, or it may be received from the user, and special offers information may be received for any number of credit cards from any number of credit card companies or users at any time. In one embodiment, the process of receiving special offers information is an independently operating process, as shown by the dotted line in the Figure at step 216.

The same rules of applicability of special offers described above for rewards programs may be used to apply special offers to other users with the same type of card, and financial institution or credit card brand.

Log in, Retrieve Bank Account and Credit Card Transaction Information, Identify Balance, Try to Identify Money Flows Schedule.

For each bank account specified by the user, bank registration information provided by the user is used to access the user's bank account information, transaction information corresponding to the user's bank account is retrieved, and the regular money flows schedule for the user and account is identified 218. In one embodiment, the bank username and bank password provided by the user, as described above, is used to log in to the user bank account via the URL of the web site received with the bank username and bank password. The account balance of each such bank account is identified, and transaction information corresponding to each such bank account, such as payments to merchants or vendors, deposits made to the user bank account, or transfers between bank accounts, may be retrieved.

Additionally, such transaction information may be used to identify a regular money flows schedule, or patterns in spending and income, corresponding to the user bank accounts, such as paychecks that may be deposited into the user's bank account on a certain day or days of each month or around a certain time or times of each month, or payments to vendors or merchants that recur at regular or irregular intervals. For example, retrieved transaction information may show that one thousand dollars is deposited into the user bank account on the 1st and $3^{rd}$ Friday of every month, that a check for nine hundred dollars is cashed against the user bank account on the $5^{th}$, $6^{th}$, or $7^{th}$ of every month, and that sixty dollars is paid electronically to the same power company at least once a month, though not necessarily on a regular schedule. From such retrieved transaction information, it may be determined that the user may receive a paycheck directly deposited into his account from an employer on the $1^{st}$ and $3^{rd}$ Friday of each month, that nine hundred dollars in rent may be paid by the user with a check at the beginning of each month, and a power bill having approximately predictable amounts based on the month of the year may be paid electronically each month by the user with each payment most likely initiated independently by the user each time.

In one embodiment, credit card log in information may similarly be used to log in to each user credit card account or the information described herein may be retrieved for some or all credit card accounts using other conventional techniques, all as part of step 218. If credit card log in information is used to log in to a user credit card account, then credit card account details may be retrieved that corresponds to the user credit card account, such as transactions from that credit card, the APR for balance transfers to the credit card, cash advances from the credit card, or purchases made with the credit card, the due date for payments made to the credit card account in a given billing cycle, the credit limit that corresponds to the credit card, and the current balance owed by the user on the credit card and the minimum payment and due date for the next payment. Money flows may be identified for credit cards, such as a wireless bill that is charged to a credit card account of approximately the same amount at approximately the same day each month. Credit card account details may be retrieved from a website that accesses the user credit card account, via conventional screen scraping techniques, or by another method of retrieving data while being logged in to the user credit card account or otherwise, or via other conventional techniques of transferring such data.

In one embodiment, credit card account details that are not retrieved by logging in to the user credit card account in the manner described above may be received directly from the user at step 214 or from another source. Credit card account details may be retrieved for any number of credit card accounts at any time, and the process of retrieving credit card account details is an independently operating process, as shown by the dotted line in the Figure at step 218.

Receive Bill Information from User and/or User Arranges to have Biller Send Bills.

Bill setup information is received 220 from the user. In one embodiment, bill setup information may be received from the user as a bill username and corresponding bill password, along with the corresponding bill URL at which the bill username and corresponding bill password may be used to log in to an account through which the user may access bills.

In one embodiment, the bill setup information may be received by a biller as a bill setup message instructing the biller on where and how to send the user's bill(s) to an operator of the presently described method. The bill setup message may include an email address corresponding to the user's username and a domain name of the operator of the method (e.g. username @ methodoperator.com) to where the biller may email the user's bills, as well as an indication that the user would like his or her bill(s) to be emailed to the provided email address. Any number of bill setup messages may be received by, any number of billers from any number of users at any time.

In one embodiment, bill setup information may be received as bill detail information input by the user. Bill detail information may include the amount due for a specific bill, the due date for the specified bill, a biller identifier corresponding to the entity from which the bill was received and information on where and how to send any bill payment. Bill setup information for any number of bills may be received for any number of users at any time, and the process of receiving bill setup information is an independently operating process, as shown by the dotted line in the Figure at step 220.

Receive/Retrieve Bills.

Bill detail information is received or bill detail information is retrieved or bill detail information is received and retrieved 222. In one embodiment, bill detail information corresponding to any number of user bill account may be received from any number of billers via the method described above. Bill detail information may also be received from the user as user input, as described above.

In one embodiment, bill detail information may be retrieved from the biller, such as through a biller website. Bill detail information may be accessed using the bill username and corresponding bill password provided by the user to access the user bill account via the specified bill URL as described above, and bill detail information may be retrieved via screen scraping, or some other method, while accessing the user bill account.

In one embodiment, bill detail information may be retrieved for a recurring bill from a biller a set number of days prior to the previously established due date for the recurring bill, or bill detail information may be retrieved for any number of user accounts from any number of billers at any other time. The process of receiving bill detail information from the user or biller and/or retrieving bill detail information from the biller is an independently operating process, as shown by the dotted line in the Figure at step 222.

Check Bill Due Dates.

Figure 3:
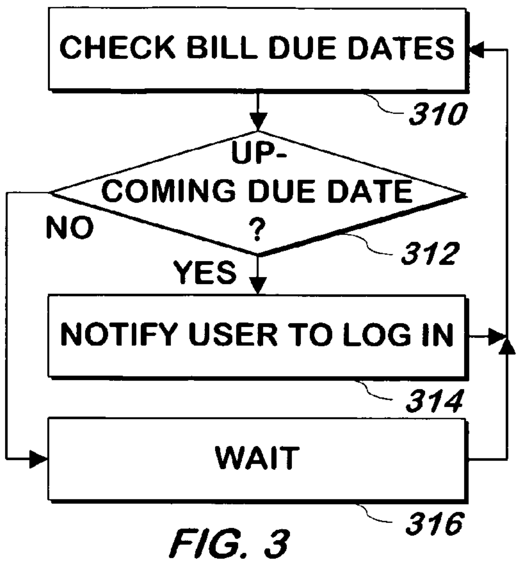
FIG. 3 is a flowchart illustrating a method of notifying a user of an upcoming bill according to one embodiment of the present invention.

At any time, bill due dates may be checked and the user may be notified of upcoming due dates. FIG. 3 is a flowchart illustrating a method of notifying a user of an upcoming bill according to one embodiment of the present invention. Referring momentarily to FIG. 3, bill due dates are checked 310. In one embodiment, the due date for every user bill in the system is checked, and the due date for any bill may be a due date previously received from the user for a specific bill, or the due date may be a date on or around the day of the week or month that a payment is usually made by the user.

In one embodiment, due date(s) for bill(s) may be checked at any time for any number of bills or users. Due dates may be checked at step 310 every day or every other day or three times a day or any number of times.

Wait.

If there is no user bill with an upcoming due date 312, then the method waits at step 316 and continues again at step 310. In one embodiment, the due date of a bill is compared to the current date to determine if the due date of the bill is upcoming.

Notify User to Log in.

If there are one or more user bills that have an upcoming due date 312, the user is notified to log in 314 to pay any upcoming bills. To notify the user to log in, a reminder or indication, such as a pop-up icon on the user's cell phone, may be displayed to the user or an e-mail may be sent to the user to notify the user of one or more bills that have an upcoming due date.

Receive User Log in and Authenticate.

Referring again to FIG. 2, a user log in is received and the user is authenticated 222. The user log in may be received in response to a notification as described above, to initiate a payment such as a point of sale payment or person to person payment, or for any other reason. In one embodiment, the user log in may be received when the user uses his or her cell phone to log into the service using the previously established username described above, and the user may be authenticated using the corresponding password that has been previously associated with the username, or by some other authentication method.

Display Upcoming Bills, Point of Sale, Person-to-Person Option, Receive User Selection.

Upcoming bills are displayed to the user, as well as a point-of-sale option and a person-to-person option, and a user selection of one of these is received 230. An upcoming bill is one received as described above that is due within a threshold period of time. The threshold may vary based on the amount of the bill, with larger bills considered coming due over a longer time period than smaller bills. To display upcoming bills, in one embodiment, bill detail information corresponding to any bills received and/or retrieved at step 222 may be sorted using the due date corresponding to each bill, and the sorted bill(s) may be displayed to the user in soonest-first order, with the first bill being the bill that is due in the shortest amount of time from the time when the user logs in, and the last bill displayed as the bill that is due in the longest amount of time from the time the user logs in. In one embodiment, if the due date for a bill has already passed, and the payment for that bill has not been sent to the corresponding biller, then bill detail information corresponding to the unpaid, late bill may be displayed first.

Other ways of displaying upcoming some or all of the bill information may be used in other embodiments. In one embodiment, some or all of the bill information described above is displayed on a calendar for upcoming bills, and in another embodiment, each potential biller is categorized, and some or all of the bill information for each upcoming bill is displayed by category.

In one embodiment, the point-of-sale (POS) option may be displayed as an option for the user to request a POS transaction to be authorized at a POS location specified by the user, such as at a retail store.

In one embodiment, the person-to-person (P/P) option may be displayed as an option for the user to request a transfer of funds from one user account to another user account.

The user selection may be received as a bill pay request, or a request to pay a user bill, along with an indication of the specific bill that the user would like to pay, or the user selection may be received as a POS transaction request, or the user selection may be received as a P/P transfer request, or the user selection may be received as some other request. In one embodiment, a P/P transfer request may be received in a similar manner with an account identifier corresponding to the account receiving the funds, and a P/P amount corresponding to the amount of money the user is requesting to be transferred.

If the user selection is received as a POS transaction request 232, a merchant identifier corresponding to the merchant for which the POS transaction is requested and a POS amount corresponding to the amount of money the user is requesting to be authorized for the POS transaction is received 234 and the method continues at step 236. In one embodiment, conventional near field communications (NFC) techniques are used to supply the information described above, or the merchant identifier is received via NFC and the amount is received from the user. Step 234 may include displaying the name of the merchant and the amount to the user, and requesting and receiving confirmation that payment in that amount to that merchant should be performed.

If the user selection is received as a P/P transaction request 232, an account identifier corresponding to the recipient account for which the P/P transfer is requested and a P/P amount corresponding to the amount of money the user is requesting to be authorized for the P/P transfer is received 234 and the method continues at step 236.

If the user selection is received 232 as a request to pay a specified user bill, then step 234 may be bypassed, and the method continues at step 236.

Select First Funding Source.

At step 236 of FIG. 2, a first funding source is selected from the available funding source(s) for the user. In one embodiment, an available funding source is any user bank account or user credit card account for which registration information has been previously received from the user, such as at step 212 or at step 214.

Determine Funds Sufficiency Score

When a funding source has been selected 236, a funds sufficiency score for the selected funding source is determined 238. To determine the funds sufficiency score of the selected funding source, factors such as the available funds from the funding source and the amount required to make a payment on the specified user bill may be compared, and a determination is made about what portion of the specified bill may be paid with the available funds from the funding source. In one embodiment, if the available funds from the selected funding source are less than the amount required to make a payment on the specified bill, then the funds sufficiency score may be determined as 0, indicating that the funding source may be disqualified from being used to pay the specified bill, or the funds sufficiency score may be determined as a number between 0 and 100 reflecting the portion or percentage of the specified user bill that may be paid from the selected funding source. If the selected funding source has the ability to pay the specified user bill in its entirety, then the selected funding source may receive a very high funds sufficiency score. In one embodiment, if the selected funding source is determined to have a very low funds sufficiency score, or a funds sufficiency score of 0, then the selected funding source may not be displayed to the user as an option for paying the specified bill, in the manner described below.

In one embodiment, the funds sufficiency score of the selected funding source may use money flows information identified as described above, such as expected expenses from other bills that have not yet been paid by the user, or from upcoming bills that may be due prior to the due date of the specified user bill. For example, the funds sufficiency score determined for a user bank account with eight hundred dollars may be less favorable, or may be 0, if a rent payment of nine hundred dollars, typically paid via check from the user bank account, is expected to be due two days prior to the due date of the specified user bill, unless a regular $1000 paycheck is expected before that time.

Benefits Score is Determined for the Selected Funding Source: Rewards, Late Due Date/After Paycheck.

One or more benefits scores are determined 240 for the selected funding source. In one embodiment, the benefits scores may be determined as any number of different benefits scores, each corresponding to the different type or types of rewards programs that are available to the user, such as a points benefits score, a cash back benefits score, an airline miles benefits score, and any number of other benefits scores. Benefits scores may reflect the benefits of using the selected funding source to pay the specified bill, and the benefits score may be determined using the type of bill being paid or the amount of the bill being paid, and/or the rewards program information received at step 214 or special offers information at step 216.

One or more different types of scores may be determined for a funding source, such as a funds sufficiency score, one or more benefits scores, and a costs score, each indicating how well a selected funding source would serve a specified bill, relative to any other available funding sources. In one embodiment, higher scores in any category may indicate a greater level of benefit, while lower scores may indicate less benefit for the user when a specified bill is paid with a selected funding source. For example, a funding source that provides 1.25 airline miles for each dollar of a purchase will receive a higher airline mile benefit score than a funding source that provides 1 airline miles per dollar of a purchase. In one embodiment, such funding source will receive a cash back benefits score of 0, indicating that no cash back is possible, if that is the case. In one embodiment, a funding source that provides different possible benefits may receive a score only for the benefit that such funding source provides that is better for that type of benefit than any other choice the user has. If a funding source provides multiple benefits for which the user has no alternative funding sources that also provide that benefit, the funding source is assigned a score for the benefit provided that corresponds to the highest preference weight for the user. Other ways of assigning benefit scores for funding sources that provide different types of benefits may be used. With respect to a card, the benefit score may be identified as a function of the benefits and special offers for the type of card (e.g. gold card), financial institution, and credit card brand (e.g. VISA, MASTERCARD).

Any number of benefits scores may be determined using all of the information above, or any information.

Costs Score Determined.

A costs score for the selected funding source is determined 242. The costs score for the selected funding source may reflect any costs or additional costs that the user may incur if the selected funding source is used to pay the specified bill, and the costs score may be determined using factors such as the APR, or APRs, associated with a user credit card account if the selected funding source is a user credit card account. In one embodiment, higher costs associated with the selected funding source will result in a lower costs score for the selected funding source, indicating that the selected funding source may not the best option for paying the specified user bill, and lower costs will result in a higher costs score. For example, a user credit card account with a high APR for purchases may receive a costs score that is lower than a user credit card that has a lower APR for purchases because paying the specified user bill with the user credit card account with a higher APR is less beneficial to the user than using the user credit card account with the lower APR. In one embodiment, if the transaction history associated with the user credit card account with the high APR shows that the credit card account is paid in full before the due date each month, and the account balances and money flows indicate the credit card is expected to be paid in full when it is due, then the costs score for that credit card account may be unaffected, or less affected, by the high APR.

The costs score may be determined as a function of the total costs incurred in addition to the amount of the payment, including APR, and the expected money flows that would, for example, allow an overdraft fee to be avoided or a credit card bill to be paid in full on or before the due date of the credit card bill.

When the funds sufficiency score, one or more benefits scores, costs score, and any other scores, have been determined for the selected funding source, a determination is made 244 whether any other funding sources are available that have not yet been scored in the manner described above.

Select Next Funding Source.

If one or more other funding sources are available 244, then the next funding source that is available to the user to pay the specified user bill is selected 246 and the method continues at step 238 using the newly selected funding source.

In one embodiment, information from the bill (such as the payee, payees address or account, or other information) is compared against a database of potential bills that represent credit obligations to determine whether the user is attempting to pay a credit obligation. In the event that the user is paying a credit obligation, only sources of funds for which funds are already in the account (and no credit will be issued) are selected in step 246 and step 236. Other user-specified sources of funds are not selected to pay the bill, and will not be displayed to the user as sources of funds from which the bill may be paid.

Weight, Sum, Sort, Display to User and Receive Funding Selection(s).

If no other funding source is available 244 to the user, because available funding source has been selected and scored in the manner described above 244, then the scores determined for each funding source are each multiplied by any respective preference weights of the user, and the optionally weighted scores are summed into one total funding source score for each funding source 248. Weights may be assigned to things for which the user may not have a preference, such as a due date benefit or the sufficiency of the funding source, in order to normalize them with the other multiplied scores. The funding source(s) are sorted and displayed based on their total funding source score(s), and a funding selection from the user is received 248.

To weight and sum the scores determined for each funding sources into one total funding source score, each score, such as the funds sufficiency score, each of the benefits scores and the costs score, determined above for each available funding source may be multiplied by its corresponding multiplier determined by the set of weights associated with the user's account, and then the total funding source score for a funding source may be determined by summing together the weighted scores for the funding source. In one embodiment, the set of weights associated with a user's account may be the initial set of weights that may have been received from the user at step 210 of the Figure. The set of weights may be updated over time from past selections of funding sources that the user has made using the system and method as described in more detail below.

The weights for each user may sum to a total of 100, with a higher multiplier, or weight, reflecting a greater importance of the category corresponding to the high multiplier. For example, if the weight for the airline miles benefits score is a high number, then the user most likely has shown indication that he or she has a high preference for earning airline miles rewards over cash back rewards or points rewards or any other type of rewards. If the airline miles benefits weight is a very high number, then the user may have shown indication that he or she even prefers earning airline miles over trying to minimize costs that may be incurred due to high interest rates, or APR.

The total funding score for the selected funding source may reflect a combination of how much a user prefers certain characteristics of the selected funding source as well as how well that particular funding source would serve the specified bill that the user is paying.

When the funding source scores have been weighted and summed in the manner described above into a total funding source score, the total funding sources scores may be used to sort, for example, in a computer storage device, the available sources into an order indicating which funding source(s) are the least and most favorable for paying the specified user bill. When the available funding sources have been sorted, the funding source are displayed to the user in sorted order, and a funding selection is received from the user 248.

In one embodiment, if the user indicated preference information for one or more funding sources as part of the registration information or otherwise as described above, the preference information for a funding source will be used to sort the funding sources. In one embodiment, a user can request that one funding source should always be displayed first, another funding source should be always displayed second, another funding source should always be displayed last, and another funding source should be displayed in sorted order as if the total score for that funding source is 20% higher than it really is. The sorting will then take into account the preference information received for such accounts. In the case of the first three accounts having the preferences described above, the preferences override the scores. In this case, the scores for those accounts need not be computed.

In one embodiment, the funding sources are displayed with the amount available from that funding source, any expected expenses that will be added to the funding source before its due date according to the money flows identified as described above, and the due date for payment, if applicable, are displayed associated with the funding source. If the bill for a credit card due is not expected to be paid in full due to the balance, the bill and the expected money flows, the due date and APR or other cost information may be displayed with that funding source.

As noted, in one embodiment, virtually any bill may be charged to a user credit card account, but when the specified user bill is for a payment to a user credit card account or other loan, then no other user credit card accounts or other types of accounts in which funds may be loaned will be selected and processed as described above, nor displayed to the user as possible funding sources.

Adjust Weights, Pay with Funding Selection.

When the funding selection is received from the user, the specified user bill may be paid using the available funding source that corresponds to the funding selection, and the user set of weights may be adjusted 250. To pay the specified user bill, a payment may be sent electronically to the biller associated with the specified user bill, or in some other manner.

In one embodiment, if the user funding selection is the funding source with the highest final funding score, i.e. it is the first funding source displayed to the user, then the user set of weights may be slightly adjusted in such a manner that the adjustment more strongly designates the user funding selection as the top choice for paying bills, such as by increasing weights that are already high while decreasing weights that are already low, or the user set of weights may not be adjusted because the user set of weights is currently accurate.

If the user funding selection is not the funding source available to the user with the highest final funding score, then the user set of weights may be adjusted to give the user funding selection a higher total score. In order to adjust the user set of weights, the user set of weights may be adjusted so that weights that correspond to the categories in which the user funding selection has the highest scores are increased, and weights that correspond to categories where the user funding selection has the lowest scores may be decreased. For example, if the user funding selection has a high airline miles benefits score but a low cash back benefits score and a low costs score, then the user set of weights may be adjusted so that the weight for the airline miles benefits score is increased and the weights for the cash back benefits score and the costs score are decreased. In one embodiment, the user set of weights may be adjusted in such a manner that the first time the user chooses to pay a bill with a funding source that is not the highest scored funding source available to the user, the ranking of the funding source chosen by the user would not become the funding source with the highest total score if the same payment was to be made; however, after the user has repeatedly chosen the same funding source multiple times to pay bills, the user set of weights may be adjusted to give the chosen funding choice top ranking among the funding sources available to the user.

System.

Figure 4:
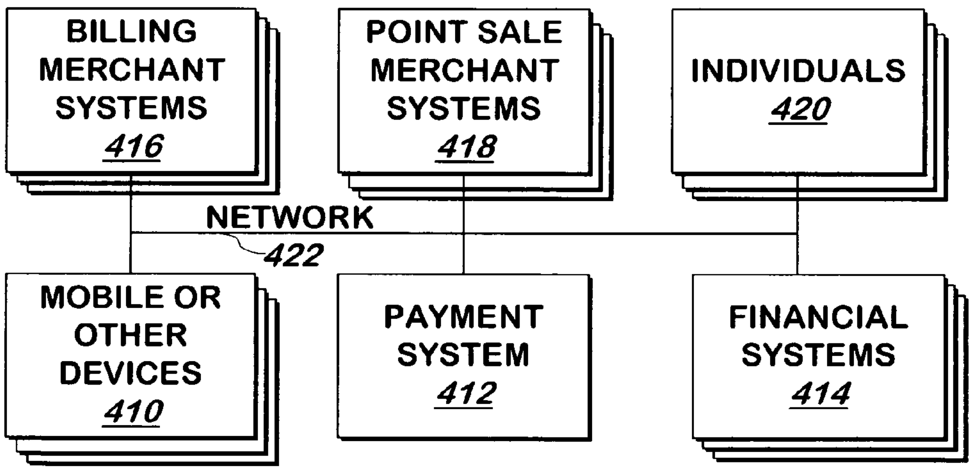
FIG. 4 is a block schematic diagram of a system for making payments according to one embodiment of the present invention.

FIG. 4 is a block schematic diagram of a system for making payments using a mobile device or other device according to one embodiment of the present invention. In one embodiment, the system contains any number of mobile devices or other devices 410, a payment system 412, any number of financial systems 414, billing merchant systems 416, point-of-sale merchant systems 418 and third-party individuals 420, though other arrangements may be used. Any mobile devices or other devices 410, financial systems 414, billing merchant systems 416 and point-of-sale merchant systems 418 operate as described herein, and communicate with payment system 412 via network 422, which may include a conventional Ethernet network, the Internet, one or more cellular networks, one or more near field communications networks, or any combination of these.

Figure 5:
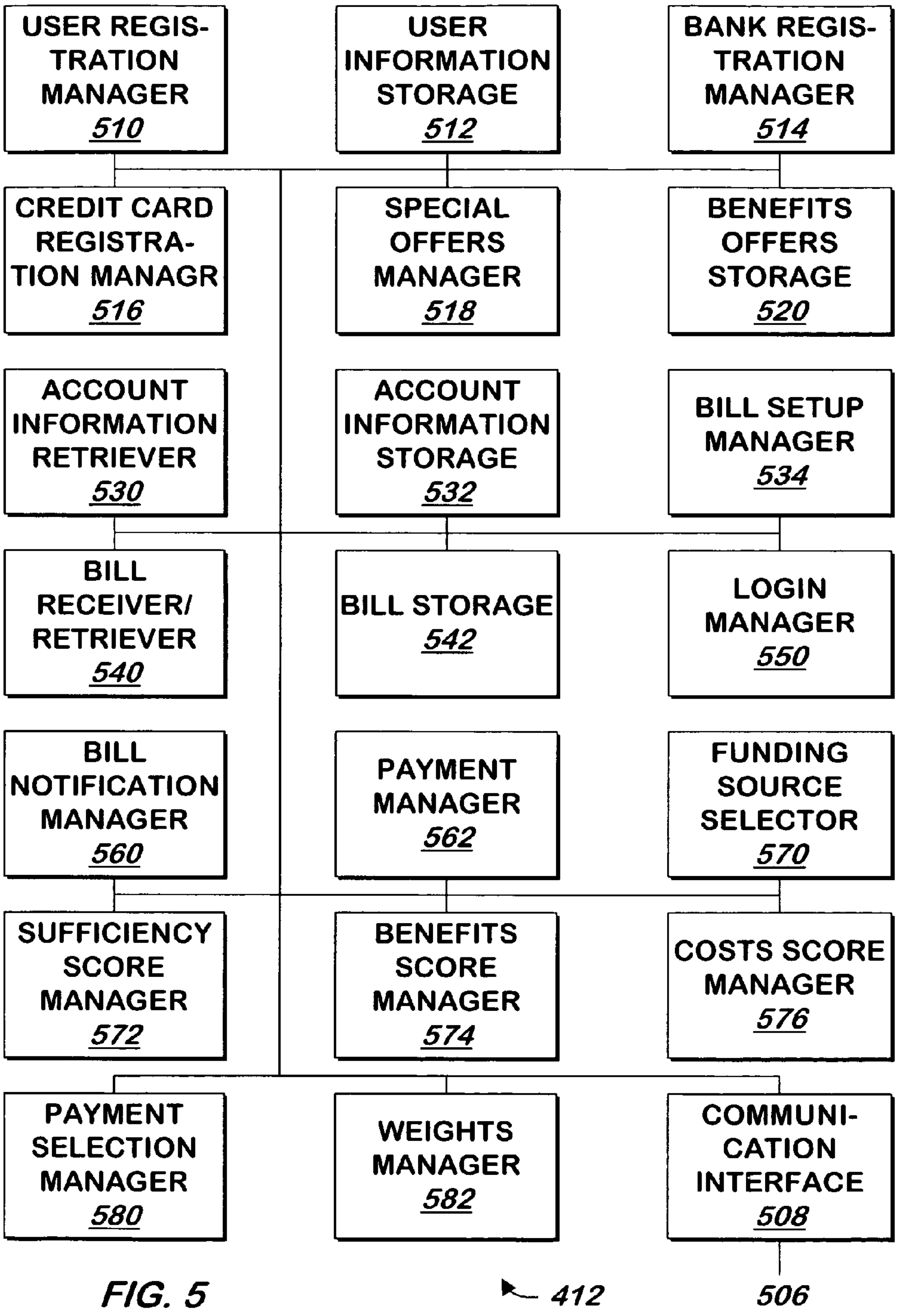
FIG. 5 is a block schematic diagram of the payment system of FIG. 4 according to one embodiment of the present invention.

Referring now to FIG. 5, a representative payment system 412 is shown in more detail according to one embodiment of the present invention. Each system 410, 412, 414, 416, 418 includes a respective communication interface (not shown), each of which may include a conventional communication interface running suitable communication protocols, such as Ethernet, TCP/IP or both, with an input/output coupled to the network 422. In one embodiment, unless otherwise noted herein, all communication with each of the systems 410-418 are made via its respective input/output of its respective communication interface.

Communication interface 508 has input/output 506 which operates as described above. A user registers an account with user registration manager 510. In one embodiment, user registration manager 510 builds a web page at the user's request containing suitable user interface elements that allow the user to provide the registration information described above and returns it to the user's browser in response. The user fills out the web page with the registration information described above and presses a submit button, which submits the information to user registration manager 510, which validates the information (for example checking for a username that is already registered, etc.) and if the validation is successful, stores such information into user information storage 512. As noted above, the username may be an e-mail address.

As described herein, web pages are used with a browser to request and provide information, however, other embodiments use an application running on each mobile or other devices 410 such as a mobile telephone instead of a browser, to provide information to, and make requests of the various elements described herein. User identifiers of the user may be placed on the user's computer system using cookies and read by each entity providing web pages as described herein, or by placing an encoded version of it in the URL of each link to each web page (to the right of the rightmost slash in the URL, for example, via URL variables). In the case of an application, the application may store the user's user identifier and pass it to the entity that processes requests or other information as described herein each time it provides a request or other information to the element of payment system 412 that processes it. An application may also receive and store information provided by the elements as described herein and provide a user interface to allow the user to provider and/or view such information. If an application is used, any of the elements described below with respect to FIG. 5 may reside on payment system 412, mobile or other devices 410 or both (in which case a portion of the element may reside on each).

The user may provide bank account information to bank registration manager 514, such as by clicking on a bank registration link on a web page provided by log in manager 550, described below. When the user's browser requests a web page from bank registration manager 514, bank registration manager 514 builds a web page containing suitable user interface elements that allow the user to provide bank account or debit account (e.g. PAYPAL) information, described above, and returns it to the user's browser in response. When the user fills out the web page with bank account information as described above, bank registration manager 514 receives the user bank account information and stores the user bank account information associated with the user's account identifier in user information storage 512.

If the user requests to enter credit card information, such as by clicking a credit card registration link on the webpage provided by log in manager 550, credit card registration manager 516 builds a web page containing suitable user interface elements that allow the user to provide the credit card information and information about other potential sources of loaned funds, such as a post-paid mobile account, described above, and returns it to the user's browser in response. The user fills out the web page with credit card information and other potential loaned funds information, such as a credit card username, credit card password, and corresponding URL, or a user credit card account number and an identifier for the credit-issuing financial system, or any other credit card information. When credit card registration manager 516 receives the user credit card information, and other loaned funds information, credit card registration manager 516 stores such information associated with the user's account identifier in user information storage 512.

Any number of users may register with user registration manager 510 at any time, and bank account information and credit card information and other information described above for any number of user accounts for any number of users may be registered with bank registration manager 514 or credit card registration manager 516 at any time. Information for other types of financial accounts may be received in a similar manner as described above.

Special offers manager 518 receives rewards program information described above, including special offers information from the user or from any financial institution or other organization associated with any user bank accounts or credit card accounts as described above, optionally via a system administrator. In one embodiment, special offers manager 518 may receive the rewards program information or special offers information via a submit button on a webpage it provides when a request is received for such a webpage, such as may be generated when the user or a system administrator clicks on a link on the webpage provided by log in manager 550, as described above, or special offers manager 518 may retrieve the rewards program information or special offers information using received credit card information, such as a credit card username and credit card password for a credit card URL as described above, or special offers manager 518 may receive the rewards program information or special offers information in another manner. If received from a user, special offers manager 518 stores any rewards program information or special offers information in benefits/offers storage 520 associated with the user identifier, optionally, as well as any identifiers for any financial institutions associated with the rewards program or special offers information, or identifiers for specific types of credit cards or other accounts for which the rewards programs or special offers apply without identifying a specific credit card.

Special offers manager 518 also receives and stores any special offers information, including the date or dates for which any special offers apply, in benefits/offers storage 520 associated with the user identifier for whom the special offers apply, as well as any identifiers for any companies associated with the special offer, or identifiers for specific types of credit cards or other specified types of accounts for which the special offers apply. Rewards program information and special offers information for any number of user accounts may be received from the user or from a system administrator or from any source at any time. If received from a financial institution, optionally via a system administrator, special offers manager 518 stores the name of the financial institution or card issuer, and type or types of cards to which the offer applies, into benefits/offers storage 520 associated with the rewards program or special offers information and dates to which the offer applies.

Account information retriever 530 logs in to any user bank accounts or the user credit card accounts registered above using bank account information or credit card information stored in user information storage 512. When account information retriever 530 logs in to the user bank account or credit card account, it retrieves account information and transaction information associated with the user account, as described above, including the account balance, and identifies any regular money flows schedule corresponding to the user account as described above. Account information retriever 530 may retrieve or receive such information using other techniques that do not require logging into the user's accounts for some or all accounts. Account information retriever 530 stores any retrieved or received account information, transaction information and any identified money flows information in account information storage 552 associated with the user identifier and the account identifier corresponding to the user bank account or user credit card account for which the information was retrieved. Account information retriever 530 may retrieve and store account information or transaction information, or identify and store any money flows schedules, for any number of users or user accounts at any time. Account information retriever 530 may designate any account as a credit account or non-credit account using information it retrieves or using a database it maintains or using any other conventional technique.

In one embodiment, account information retriever 530 may log in to a user credit card account, or use other techniques to obtain information, and also retrieve or receive details corresponding to the credit card account described above, such as APR information, the due date and credit limit for the credit card, the issuer, financial institution and card type, and store such information in account information storage 552 associated with the user identifier and the user's account identifier for the credit card account. Some or all of this information may be received or retrieved from publicly available sources.

Bill setup manager 534 may receive bill setup information from the user, as described above, at any time. At the user's request, such as when a user clicks a bill setup link on the webpage provided by log in manager 550, bill setup manager 534 may build a web page containing suitable user interface elements that allow the user to provide the bill setup information described above, and return it to the user's browser in response. When such information is entered by the user, bill setup manager 534 receives the bill setup information described above, such as a biller identifier, bill username, bill password, and bill URL described above, and stores the received bill setup information in bill storage 542 associated with the user identifier. In one embodiment, when bill setup manager 534 receives the biller identifier, for example, the name of the company issuing the bill, bill setup manager 534 may use the received biller identifier to verify that a corresponding biller routing number or biller account number, or both, for the account at which the biller receives bill payments has been stored in bill setup storage 542. In one embodiment, the biller account routing number or biller account number corresponding to the biller identifier may be entered at any time into bill storage 542 by a system administrator, or the information may be stored in bill storage 542 in some other manner. If bill setup manager 534 does not locate the corresponding biller identifier and/or biller routing number in bill storage 542, bill setup manager 534 may request such biller information from the user or from another source.

Billing merchant systems 416 of FIG. 4 may receive bill setup information from the user as a bill setup message, as described above, at any time. When billing merchant systems 416 of FIG. 4 receives the bill setup message, billing merchant systems 416 of FIG. 4 may store such information, including the designated recipient for the user's bills, such as the email address or postal address where the user's bills will be sent, in its own storage (not shown) and send bill details information to bill receiver/retriever 540 in the manner requested by the user, as described above.

In one embodiment, the user may request to provide bill details information as described above, such as by clicking a bill details link on the webpage provided by log in manager 550. When the user clicks the bill details link, bill receiver/retriever manager 540 builds a web page containing suitable user interface elements that allow the user to provide the bill details information described above, and returns it to the user's browser in response. The user fills out the web page with the bill details information for a user bill, such as the bill amount, bill due date, biller identifier, user bill account identifier, and any additional bill payment information as described above.

When bill receiver/retriever 540 receives the bill details information from the user, bill receiver/retriever 540 stores the bill details information in bill storage 542 associated with the user identifier. Similarly, bill receiver/retriever 540 may also receive, and store in bill storage 542, bill details information from billing merchant systems 416 of FIG. 4 as arranged by the user above.

Bill receiver/retriever 540 may also retrieve bill details information for the user using bill setup information stored in bill storage 542. In one embodiment, bill receiver/retriever 540 may retrieve and use the bill username, bill password and corresponding bill URL to access the user bill and retrieve bill details information, as described above. Bill receiver/retriever 540 stores any retrieved bill details information, including the biller identifier for the billing entity from which the bill details-information was retrieved or received, user bill account identifier, bill amount due, and bill. due date, into bill storage 542 associated with the user identifier for which the bill details information was retrieved. At any time, bill receiver/retriever 540 may receive or retrieve, and store, bill details information for any number of user bills in the manner described above.

Bill notification manager 560 determines if there are any upcoming bills for the user. Bill notification manager 560 may identify any upcoming bills, described above, for the user by comparing the due date associated with bills in bill storage 542 against the current date and time, which may be determined from a system clock (not shown), and identifying any bills that are due within the due date threshold described above. When bill notification manager 560 identifies any upcoming bills for the user, then bill notification manager 560 may notify the user to log in and pay the upcoming bill(s) as described above. In one embodiment, bill notification manager 560 notifies the user of the upcoming bill(s) via an email message sent to the user's email, via smartphone push notification, or a text message or a notification icon sent to the user's cell phone, or via any other conventional method. To send a text message or notification icon to the user's cell phone, bill notification manager 560 may retrieve the cell phone number associated with the user identifier from user information storage 512.

When the user receives the notification from bill notification manager 560, or at any other time, the user may log in to log in manager 550 using conventional log in techniques as described above. In one embodiment, the user may log in via the user's cell phone as described above, and log in manager 550 may authenticate the user as described above. In the case of an application on the user's cell phone, the user's log in information may be stored as part of the application. When log in manager 550 has authenticated the user log in, log in manager 550 may signal payment manager 562 to display upcoming bills to the user, as well as the point of sale (POS) transaction option and the person-to-person transfer (P/P) option described above, and payment manager 562 complies.

When payment manager 562 has displayed upcoming bills, and user interface elements to allow the user to select the POS transaction option and the P/P transfer option in the manner described above, the user may request to pay a bill, initiate a POS transaction or initiate a P/P transfer by so indicating to payment manager 562 via the user interface payment manager 562 provides, as described above. In one embodiment, payment manager 562 may display upcoming bills in sorted order with the most urgent bill, or bill with the soonest due date, displayed first, or payment manager 562 may display upcoming bills with a calendar indicating the due date associated with each upcoming bill, or payment manager 562 may display bills in any other manner, as described above.

Payment manager 562 receives the user selection and builds a payment object associated with the user identifier and type of transaction requested. Payment manager 562 may build any number of payment objects at any time for any transactions or bill payments requested by the user.

If payment manager 562 receives a POS transaction request or a P/P transfer request, payment manager 562 requests and receives from the user, or an NFC terminal that is part of a point-of-sale merchant system 418, the payment amount for the requested transaction, as well as a merchant identifier or merchant bank account identifier, if the requested transaction is a POS transaction, or the account identifier or user identifier corresponding to the personal account to which the user is requesting to transfer funds, or the home address of the funds recipient to which the user would like a check mailed, if the requested transaction is a P/P transfer. In one embodiment, payment manager 562 may also request and receive from the user any additional account details for the recipient account to which the user is requesting to send funds, such as a recipient bank routing number or recipient bank name for a P/P transfer request. For a POS transaction request, payment manager 562 may receive the requested transaction and recipient account details information via conventional NFC communications with the NFC terminal. Payment manager 562 adds any received transaction or recipient information, such as described above, to the payment object. In one embodiment, if the transaction requested is a POS or P/P transaction, payment manager 562 may add the due date of the transaction to the payment object as the current date or a future date entered by the user or some other date.

If payment manager 562 receives the user selection as a request to pay a bill, payment manager 562 may add the bill details information corresponding to the bill the user has requested to pay, including the bill amount due, bill due date, biller identifier and user bill account identifier described above, to the payment object. To add bill details information to the payment object, payment manager 562 may retrieve the bill details information from bill storage 542. In one embodiment, payment manager 562 may also retrieve from bill storage 542 any biller account information for the account(s) at which the biller receives bill payments, such as a biller bank account identifier and biller bank routing information, as described above, and payment manager 562 may add such information to the payment object with the bill details information.

When payment manager 562 has added the POS or P/P transaction information, or when payment manager 562 has added bill details information to the payment object, payment manager 562 sends the payment object to funding source selector 570. When funding source selector 570 receives the payment object from payment manager 562, funding source selector 570 determines which user funding sources are available to fund the payment requested in the payment object, and adds those available funding sources to the payment object. As described above, if the requested transaction is a request to pay a user credit card bill or other loan, then the user credit card or loan account associated with the credit card bill, as well as any other user credit card accounts or other accounts that are not prepaid, may not be added to the payment object as available funding sources by funding source selector 570. To add any available funding sources to the payment object, funding source selector 570 may add the account identifier corresponding to each available funding sources to the payment object. When funding source selector 570 has added the available funding sources to the payment object, funding source selector 570 sends the payment object to sufficiency score manager 574.

When sufficiency score manager 572 receives the payment object from funding source selector 570, sufficiency score manager 572 determines the funds sufficiency score, described above, for each funding source in the payment object relative to the payment request in the payment object, and adds the funds sufficiency score associated with each funding source to the payment object. In one embodiment, sufficiency score manager 572 retrieves the available account balance or credit limit information, and optionally any money flows schedules, corresponding to each funding source in the payment object from account information storage 552 to determine the funds sufficiency score described above. When sufficiency score manager 572 has added the funds sufficiency score for each funding source to the payment object, sufficiency score manager 572 sends the payment object to benefits score manager 574.

When benefits score manager 574 receives the payment object, benefits score manager 574 determines any number of benefits scores, such as the points score, cash back score and airline miles score described above, for each of the funding sources in the received payment object. Benefits score manager 574 adds the benefits scores to the payment object associated with each funding source, and sends the updated payment object to costs score manager 576. In one embodiment, to determine benefits scores, benefits score manager 574 may retrieve any currently applicable rewards program information or special offers information corresponding to the available funding sources in the payment object from benefits/offers storage 520. Benefits score manager 574 uses the issuer, financial institution and type of card stored in account information storage 552 and looks up any currently applicable benefits for that issuer, financial institution and type of card stored in benefits/offers storage 520, and also includes such benefits.

When costs score manager 576 receives the payment object, costs score manager 576 determines the costs score described above for the available funding source in the payment object. In one embodiment, costs score manager 576 may retrieve account information corresponding to each available funding source in the payment object, such as APR, due date and credit limit information, and optionally money flows information, from account information storage 552, to determine the costs score for each funding source. Costs score manager 576 adds each costs score to the payment object associated with its corresponding funding source, and sends the payment object to funding source selector 570.

When funding source selector 570 receives the payment object with the funds sufficiency score, benefits scores and costs score added for each available funding source in the payment object, funding source selector 570 sends the payment object to payment selection manager 580.

When payment selection manager 580 receives the payment object, payment selection manager 580 weights the funding source scores for each available funding source in the payment object using the set of weights, described above, corresponding to the user identifier in the payment object. Payment selection manager 580 sums the weighted funding source scores into a total funding score for each funding source in the manner described above, and displays the available funding sources to the user in sorted order from most beneficial to least beneficial in the manner described above. In one embodiment, any preference information for each funding source will be used as described above to adjust the order, and such information may be used to skip computing any scores for funding sources for which the order has been specified by the user as described above. In one embodiment, payment selection manager 580 retrieves the set of weights information corresponding to the user from user information storage 512, and sorts (e.g. in a computer storage device) the available funding sources using the total funding scores calculated for each funding source, with the funding source corresponding to the highest total funding score being displayed first. When payment selection manager 580 has displayed the available funding sources to the user in the sorted manner described above, the user may select one or more funding sources to fund the requested transaction.

When payment selection manager 580 receives the user funding selection, payment selection manager 580 initiates the requested transfer of funds from the user funding selection to the specified recipient account. In one embodiment, payment manager 580 identifies financial systems 414 of FIG. 4 that is associated with the user funding selection and sends a request to identified financial systems 414 of FIG. 4 for a transfer of funds from the user account associated with the user bank identifier or user credit card identifier or another identifier corresponding to the user funding selection in the amount specified in the payment object, along with any recipient account information from the payment object, such as the biller routing information and biller account identifier, or individual's routing information and account identifier, or postal address, or merchant routing number and merchant account identifier. In one embodiment, payment manager 580 may send the transfer of funds request, including the user's account identifier at financial systems 414 of FIG. 4, with a user bill account identifier if the requested transfer is a bill payment, or a transaction identifier or NFC transaction serial identifier, or both, such as received via NFC communications from the NFC terminal, if the requested transfer is a POS transaction, or any additional identifiers or information corresponding to the requested transaction that may be used to identify, or verify the identify, of the user requesting the transaction.

When financial systems 414 of FIG. 4 receives such a request from payment manager 580, financial systems 414 of FIG. 4 complies and sends the requested payment to billing merchant systems 416, point-of-sale merchant systems 418, individuals 420 or other financial systems 414 of FIG. 4 as specified by payment manager 580 in any conventional manner along with any user identifiers or transaction identifiers received from payment manager 580, and the recipient system receives the funds. In one embodiment, if billing merchant systems 416 of FIG. 4 receives funds from financial systems 414 of FIG. 4 with a user bill account identifier it credits the account associated with the received user bill account identifier with the amount of funds received. If point-of-sale merchant systems 418 of FIG. 4 receives funds from financial systems 416 of FIG. 4 with a transaction identifier or NFC serial identifier or both, it may provide a signal or other indication that such a payment has been received, and the NFC terminal at which the user requested the POS transaction receives the signal so that a retail clerk will allow a customer to leave a store with a purchase. If financial systems 414 of FIG. 4 receives funds with a user account identifier, it credits the financial account associated with the received user account identifier in the amount of funds received. In one embodiment, financial systems 414 of FIG. 4 may receive funds with a user home address or other postal address. Financial systems 414 of FIG. 4 may send a check in the amount of funds received to the address received, or it may send the check to the home address, or other address, associated with the user account identifier received.

In one embodiment, in addition to initiating the transfer of funds specified in the payment object as described above, payment selection manager 580 may mark in the payment object the user funding source selected and send the marked payment object to weights manager 582. Payment selection manager 580 may also notify the user when the requested payment has been initiated.

When weights manager 582 receives the payment object marked with the user funding selection, weights manager 582 may adjust the set of weights in user information storage 512 that are associated with the user identifier in the payment object in the manner described above using the marked funding source. In one embodiment, when weights manager 582 has updated the user set of weights using the user funding selection in the payment object as described above, weights manager 582 may destroy the payment object.

The various storage devices described herein (including 512, 520, 532 and 542) may be or include conventional computer storage devices, such as memory or disk storage.

What is claimed is:

1. A method of initiating a payment, the method comprising:

receiving identifiers of a plurality of funding sources of each of a plurality of users;

receiving information about a plurality of benefits of at least some of the plurality of funding sources;

receiving information about at least one cost of using at least some of the plurality of funding sources to fund payments;

identifying preferences of each of the plurality of users for each of the plurality of benefits and the at least one cost;

receiving information about a payment to be made from one of the plurality of users to a different party;

electronically retrieving, from a plurality of networked servers, available funding amounts from the plurality of funding sources of said one of the plurality of users;

ordering in a computer storage, by at least one hardware computer processor, the plurality of funding sources of said one of the plurality of users responsive to the preferences identified for that user, the information about the payment to be made, the information about at least one cost for each of said plurality of funding sources and the information about the plurality of benefits for each of said plurality of funding sources;

providing, for display on a display device, to the one of the plurality of users at least some of the available balances of the plurality of funding sources retrieved of said one of the plurality of users responsive to the order;

receiving a selection of at least one of the ordered, displayed funding sources from said one of the plurality of users;

updating the preferences of the said one of the plurality of users responsive to the selection; and initiating payment to the different party using the selected at least one of the funding sources.

2. The method of claim 1, additionally comprising:

determining if any of the funding sources of the one of the plurality of users is not allowed to be used to fund the payment; and wherein the displaying step is responsive to the determining step.

3. The method of claim 1, additionally comprising:

receiving transaction information from at least some of the funding sources for each of the plurality of users;

identifying at least one repeating payment for each of at least some of the plurality of users responsive to the transaction information received; and displaying at least one repeating payment at or near the same time as at least one of the available balances is displayed.

4. The method of claim 1, wherein:

the information about at least one of the at least one cost comprises information regarding whether a funding source can be paid before a fee is incurred for not paying the funding source; and the ordering in the computer storage at least some of the identifiers of the plurality of funding sources of said one of the plurality of users is additionally responsive to a determination as to whether a funding source can be paid before a fee is incurred for not paying funding source.

5. The method of claim 4 wherein:

the information about the at least one cost comprises information about at least one previous deposit made to at least one of the plurality of funding sources; and the determination is responsive to at least one of the least one previous deposit made to at least one of the plurality of funding sources.

6. The method of claim 1, wherein at least one funding source has a credit card type and information about one of the plurality of benefits used for the ordering is received for the credit card type of funding source without identifying the funding source.

7. A system for initiating a payment, the system comprising:

at least one registration manager, the at least one registration manager having at least one input for receiving identifiers of a plurality of funding sources of each of a plurality of users and information about a plurality of benefits of at least some of the plurality of funding sources, at least one of the at least one registration manager having an input for receiving user supplied information, at least one of the at least one registration manager for providing at an output of said registration manager the identifiers of the plurality of funding sources of each of a plurality of users and information about the plurality of benefits of at least some of the plurality of funding sources, at least one of the at least one registration manager for identifying preferences of each of the plurality of users for each of the plurality of benefits and the at least one cost responsive to the user supplied information, and for providing at said at least one registration manager output, indications of the preferences of each of the plurality of users identified;

a computer storage device having an input coupled to the output of at least one of the at least one registration manager for receiving the indications, the computer storage device for providing at an output the indications received at the computer storage device input;

an account information retriever having an input coupled to at least one of the at least one registration manager for receiving the identifiers of the plurality of users, and coupled for receiving information about at least one cost of using at least some of the plurality of funding sources to fund payments, and an input/output for electronically retrieving available funding amounts from the plurality of funding sources of said one of the plurality of users the account information retriever for providing at an output the received information about at least one cost of using at least some of the plurality of funding sources to fund payments and the available funding amounts from the plurality of funding sources;

a payment manager having an input for receiving information about a payment to be made from one of the plurality of users to a different party comprising an identifier of the one of the plurality of users, an identifier of the different party and an amount, the payment manager for providing at an output the information about the payment to be made;

a payment selection manager comprising at least one hardware computer processor having an input coupled to the payment manager for receiving at least some of information about the payment to be made, and coupled to at least one registration manager for receiving the identifiers of the plurality of funding sources of each of a plurality of users and information about the plurality of benefits of at least some of the plurality of funding sources and coupled to the computer storage device output for receiving the indications of the preferences of each of the plurality of users, and coupled to the account information retriever output for receiving the information about the at least one cost, and coupled to at least one selected from the registration manager and a weights manager for receiving at least some of the preferences, the payment selection manager for ordering in a computer storage at least some of the identifiers of the plurality of funding sources of said one of the plurality of users responsive to the indications of the preferences identified for said user, the information about at least one cost for each of said plurality of funding sources and the information about the plurality of benefits for each of said plurality of funding sources and the at least some of the information about the payment to be made, for providing at an output for display to the one of the plurality of users at least some of the available balances of the plurality of funding sources retrieved of said one of the plurality of users responsive to the order, for receiving from said one of the plurality of users at the payment selection manager input a selection of at least one of the ordered, displayed funding sources from said one of the plurality of users, for providing at the payment selection manager output the selection of the at least one of the funding sources, and for initiating payment to the different party using the selected at least one of the funding sources via the payment selection manager output; and a weights manager having an input coupled to the payment selection manager output for receiving the selection and to the payment manager output for receiving the identifier of the user, the weights manager for updating the computer storage device the indications of the preferences of the said one of the plurality of users responsive to the selection via an output coupled to the computer storage device input.

8. The system of claim 7, additionally comprising a funding source selector having an input coupled to at least one of the at least one registration manager for receiving the identifiers of the plurality of funding sources of each of a plurality of users, and to the payment manager output for receiving the information about the payment to be made, the funding source selector for determining whether at least one of the funding sources of the one of the plurality of users is allowed to be used as a source of funds for the payment to be made, and for providing at an output an indication as to whether at least one of the plurality of funding sources is available to be used as a source of funds for the payment to be made, the indication identifying at least one of the sources of funds that is or is not available as a funding source for the payment to be made; and wherein the payment selection manager input is additionally coupled to the funding source selector output for receiving the indication, and the payment selection manager provides for display responsive to the indication.

9. The system of claim 7, wherein:

the account information retriever input is additionally coupled for receiving transaction information from at least some of the funding sources for each of the plurality of users;

the account information retriever is additionally for receiving transaction information from at least some of the funding sources for each of the plurality of users, for identifying at least one repeating payment for each of at least some of the plurality of users responsive to the transaction information received, and for providing the at least one repeating payment for each of at least some of the plurality of users at an output;

the payment selection manager input is additionally coupled to the account information retriever output for receiving the at least one repeating payment for each of at least some of the plurality of users the payment selection manager provides for display at least one repeating payment at or near the same time as at least one of the available balances is displayed.

10. The system of claim 7, wherein:

the information about at least one of the at least one cost comprises information regarding whether a funding source can be paid before a fee is incurred for not paying the funding source; and the payment selection manager orders in the computer storage at least some of the identifiers of the plurality of funding sources of said one of the plurality of users additionally responsive to a determination as to whether a funding source can be paid before a fee is incurred for not paying funding source.

11. The system of claim 10 wherein:

the information about the at least one cost comprises information about at least one previous deposit made to at least one of the plurality of funding sources; and and the payment selection manager makes the determination responsive to at least one of the at least one previous deposit made to at least one of the plurality of funding sources.

12. The system of claim 7, wherein at least one funding source has a credit card type and information about one of the plurality of benefits used for the ordering is received for the credit card type of funding source without identifying the funding source.

13. A method of initiating a payment, the method comprising:

receiving identifiers of a plurality of funding sources of each of a plurality of users who will use at least one of the plurality of funding sources to make a payment to a different party when at least some of the funding sources are sorted and presented to them;

receiving information about a plurality of benefits of at least some of the plurality of funding sources that will be sorted responsive to the benefits;

receiving information about at least one cost of using at least some of the plurality of funding sources to fund payments made after at least some of the funding sources are sorted responsive to the costs;

identifying preferences to be used to sort funding sources of each of the plurality of users for each of the plurality of benefits and the at least one cost;

receiving information about a payment to be made from one of the plurality of users to a different party using at least one of the funding sources that will be sorted and displayed to the user;

electronically receiving from a plurality of networked servers, available funding amounts from the plurality of funding sources of said one of the plurality of users after the preferences have been received;

ordering in a computer storage, by at least one hardware computer processor, the plurality of funding sources of said one of the plurality of users responsive to the preferences identified for that user, the information about the payment to be made, the information about at least one cost for each of said plurality of funding sources and the information about the plurality of benefits for each of said plurality of funding sources;

providing for display on a display device, to the one of the plurality of users at least some of the available balances of the plurality of funding sources retrieved of said one of the plurality of users responsive to the order;

receiving a selection of at least one of the ordered, displayed funding sources from said one of the plurality of users; and initiating payment to the different party using the selected at least one of the funding sources.

14. A computer program product comprising a non-transitory computer useable medium having computer readable program code embodied therein for initiating a payment, the computer program product comprising computer program product comprising computer readable program code devices configured to cause a computer system to:

receive identifiers of a plurality of funding sources of each of a plurality of users;

receive information about a plurality of benefits of at least some of the plurality of funding sources;

receive information about at least one cost of using at least some of the plurality of funding sources to fund payments;

identify preferences of each of the plurality of users for each of the plurality of benefits and the at least one cost;

receive information about a payment to be made from one of the plurality of users to a different party;

electronically receive available funding amounts from the plurality of funding sources of said one of the plurality of users;

order in a computer storage, using at least one hardware computer processor in the computer system, the plurality of funding sources of said one of the plurality of users responsive to the preferences identified for that user, the information about the payment to be made, the information about at least one cost for each of said plurality of funding sources and the information about the plurality of benefits for each of said plurality of funding sources;

provide for display to the one of the plurality of users at least some of the available balances of the plurality of funding sources retrieved of said one of the plurality of users responsive to the order;

receive a selection of at least one of the ordered, displayed funding sources from said one of the plurality of users;

update the preferences of the said one of the plurality of users responsive to the selection; and initiate payment to the different party using the selected at least one of the funding sources.

15. The computer program product of claim 14:

additionally comprising computer program product comprising computer readable program code devices configured to cause the computer system to determine if any of the funding sources of the one of the plurality of users is not allowed to be used to fund the payment; and wherein the displaying step is responsive to the determining step.

16. The computer program product of claim 14, additionally comprising computer readable program code devices configured to cause the computer system to:

receive transaction information from at least some of the funding sources for each of the plurality of users;

identify at least one repeating payment for each of at least some of the plurality of users responsive to the transaction information received; and display at least one repeating payment at or near the same time as at least one of the available balances is displayed.

17. The computer program product of claim 14, wherein:

the information about at least one of the at least one cost comprises information regarding whether a funding source can be paid before a fee is incurred for not paying the funding source; and the computer readable program code devices configured to cause the computer system to order in the computer storage at least some of the identifiers of the plurality of funding sources of said one of the plurality of users are additionally responsive to a determination as to whether a funding source can be paid before a fee is incurred for not paying funding source.

18. The computer program product of claim 17 wherein:

the information about the at least one cost comprises information about at least one previous deposit made to at least one of the plurality of funding sources; and the determination is responsive to at least one of the least one previous deposit made to at least one of the plurality of funding sources.

19. The computer program product of claim 14, wherein at least one funding source has a credit card type and information about one of the plurality of benefits used for the ordering is received for the credit card type of funding source without identifying the funding source.

* * * * *